(12) United States Patent
Meier et al.

(10) Patent No.: US 11,176,045 B2
(45) Date of Patent: Nov. 16, 2021

(54) SECONDARY PREFETCH CIRCUIT THAT REPORTS COVERAGE TO A PRIMARY PREFETCH CIRCUIT TO LIMIT PREFETCHING BY PRIMARY PREFETCH CIRCUIT

(71) Applicant: Apple Inc., Cupertino, CA (US)

(72) Inventors: Stephan G. Meier, Los Altos, CA (US); Tyler J. Huberty, Sunnyvale, CA (US); Nikhil Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 16/832,893

(22) Filed: Mar. 27, 2020

(65) Prior Publication Data
US 2021/0303471 A1  Sep. 30, 2021

(51) Int. Cl.
*G06F 12/00* (2006.01)
*G06F 12/0862* (2016.01)
*G06F 9/38* (2018.01)

(52) U.S. Cl.
CPC ........ *G06F 12/0862* (2013.01); *G06F 9/3802* (2013.01); *G06F 9/384* (2013.01); *G06F 9/3818* (2013.01); *G06F 9/3842* (2013.01); *G06F 2212/1021* (2013.01); *G06F 2212/602* (2013.01)

(58) Field of Classification Search
CPC .. G06F 12/0862; G06F 9/3802; G06F 9/3818; G06F 9/384; G06F 9/3842; G06F 2212/1021; G06F 2212/602
See application file for complete search history.

(56) References Cited

U.S. PATENT DOCUMENTS

| | | | |
|---|---|---|---|
| 6,571,318 B1 * | 5/2003 | Sander ................ | G06F 12/0862 711/137 |
| 7,383,393 B2 | 6/2008 | Al Sukhni et al. | |
| 9,886,385 B1 * | 2/2018 | Huberty ............. | G06F 12/0897 |
| 9,904,624 B1 * | 2/2018 | Huberty ............. | G06F 12/0811 |
| 10,331,567 B1 | 6/2019 | Meier et al. | |
| 2004/0123043 A1 * | 6/2004 | Rotithor ............. | G06F 12/0215 711/137 |
| 2004/0268050 A1 * | 12/2004 | Cai ..................... | G06F 12/0862 711/137 |
| 2006/0248280 A1 * | 11/2006 | Al-Sukhni .......... | G06F 9/30047 711/137 |
| 2006/0248281 A1 * | 11/2006 | Al-Sukhni ........... | G06F 9/3832 711/137 |

(Continued)

*Primary Examiner* — Prasith Thammavong
(74) *Attorney, Agent, or Firm* — Kowert, Hood, Munyon, Rankin & Goetzel, P.C.; Lawrence J. Merkel

(57) ABSTRACT

In an embodiment, a processor includes a plurality of prefetch circuits configured to prefetch data into a data cache. A primary prefetch circuit may be configured to generate first prefetch requests in response to a demand access, and may be configured to invoke a second prefetch circuit in response to the demand access. The second prefetch circuit may implement a different prefetch mechanism than the first prefetch circuit. If the second prefetch circuit reaches a threshold confidence level in prefetching for the demand access, the second prefetch circuit may communicate an indication to the primary prefetch circuit. The primary prefetch circuit may reduce a number of prefetch requests generated for the demand access responsive to the communication from the second prefetch circuit.

20 Claims, 9 Drawing Sheets

(56) References Cited

U.S. PATENT DOCUMENTS

| | | |
|---|---|---|
| 2007/0101100 A1 | 5/2007 | Al Sukhni et al. |
| 2007/0204267 A1* | 8/2007 | Cole .................. G06F 12/0842 |
| | | 718/100 |
| 2016/0062768 A1* | 3/2016 | Jagannathan ....... G06F 9/30047 |
| | | 711/137 |
| 2017/0371790 A1* | 12/2017 | Dwiel ................. G06F 12/0811 |
| 2018/0018266 A1 | 1/2018 | Jones, III |
| 2018/0181402 A1* | 6/2018 | Zhang .................... G06F 9/383 |
| 2019/0179757 A1* | 6/2019 | Walker .................. G06F 13/161 |
| 2019/0370176 A1* | 12/2019 | Priyadarshi ......... G06F 12/0891 |

\* cited by examiner

50

SECONDARY PREFETCH CIRCUIT THAT REPORTS COVERAGE TO A PRIMARY PREFETCH CIRCUIT TO LIMIT PREFETCHING BY PRIMARY PREFETCH CIRCUIT

BACKGROUND

Technical Field

Embodiments disclosed herein are related to prefetch mechanisms in processors.

Description of the Related Art

Processors continue to be produced with both higher operating frequencies and higher average numbers of instructions executed per clock cycle (IPC). Memory latency, on the other hand, has decreased at a much slower rate. As a result, processors are often stalled awaiting instructions and/or data from memory. In order to improve performance, processors typically include one or more levels of caching. Data stored in the cache is available at a much lower latency than data from memory. Thus, cache hits can be provided with low latency and can improve performance of the processors. Cache misses are fetched from memory and incur the higher memory latencies.

In an attempt to reduce the effective memory latency even further, processors can implement prefetching. Generally, prefetching involves predicting which cache blocks the processor will need to access soon, and initiating the memory read for the cache blocks prior to such accesses being generated via instruction code execution in the processor. If the prefetching successfully reads cache blocks that are later accessed by the processor, memory latency is reduced because the accesses are cache hits instead of cache misses. On the other hand, inaccurate prefetching can cause useful data to be removed from the cache. Since the useful data is a cache miss after being displaced by the inaccurately prefetched data and since the inaccurately prefetched data is not accessed, memory latency can increase, which reduces performance. Additionally, even if performance is not adversely affected or improved by a small amount, excess power consumed by the processor to perform the prefetching might not be justified. Particularly, in portable devices in which the available energy is limited (e.g. from a battery), the excess power consumption can reduce battery life. Balancing the amount of prefetching to be performed and the effectiveness of the prefetching is a challenge.

In some cases, processors implement multiple prefetchers using different prefetch schemes. While the different prefetchers can more accurately prefetch a variety of data streams, the multiple prefetchers are more likely to compete for prefetching the same data streams and/or are more likely to over prefetch, reducing overall accuracy and consuming power unnecessarily.

SUMMARY

In an embodiment, a processor includes a plurality of prefetch circuits configured to prefetch data into a data cache. A primary prefetch circuit may be configured to generate first prefetch requests in response to a demand access, and may be configured to invoke a second prefetch circuit in response to the demand access. The second prefetch circuit may implement a different prefetch mechanism than the first prefetch circuit. If the second prefetch circuit reaches a threshold confidence level in prefetching for the demand access, the second prefetch circuit may communicate an indication to the primary prefetch circuit. The primary prefetch circuit may reduce a number of prefetch requests generated for the demand access responsive to the communication from the second prefetch circuit. Over prefetching and competition between the plurality of prefetch circuits may be reduced, since the second prefetch circuit is prefetching for the demand access at a high degree of accuracy.

BRIEF DESCRIPTION OF THE DRAWINGS

The following detailed description makes reference to the accompanying drawings, which are now briefly described.

Figure 1:
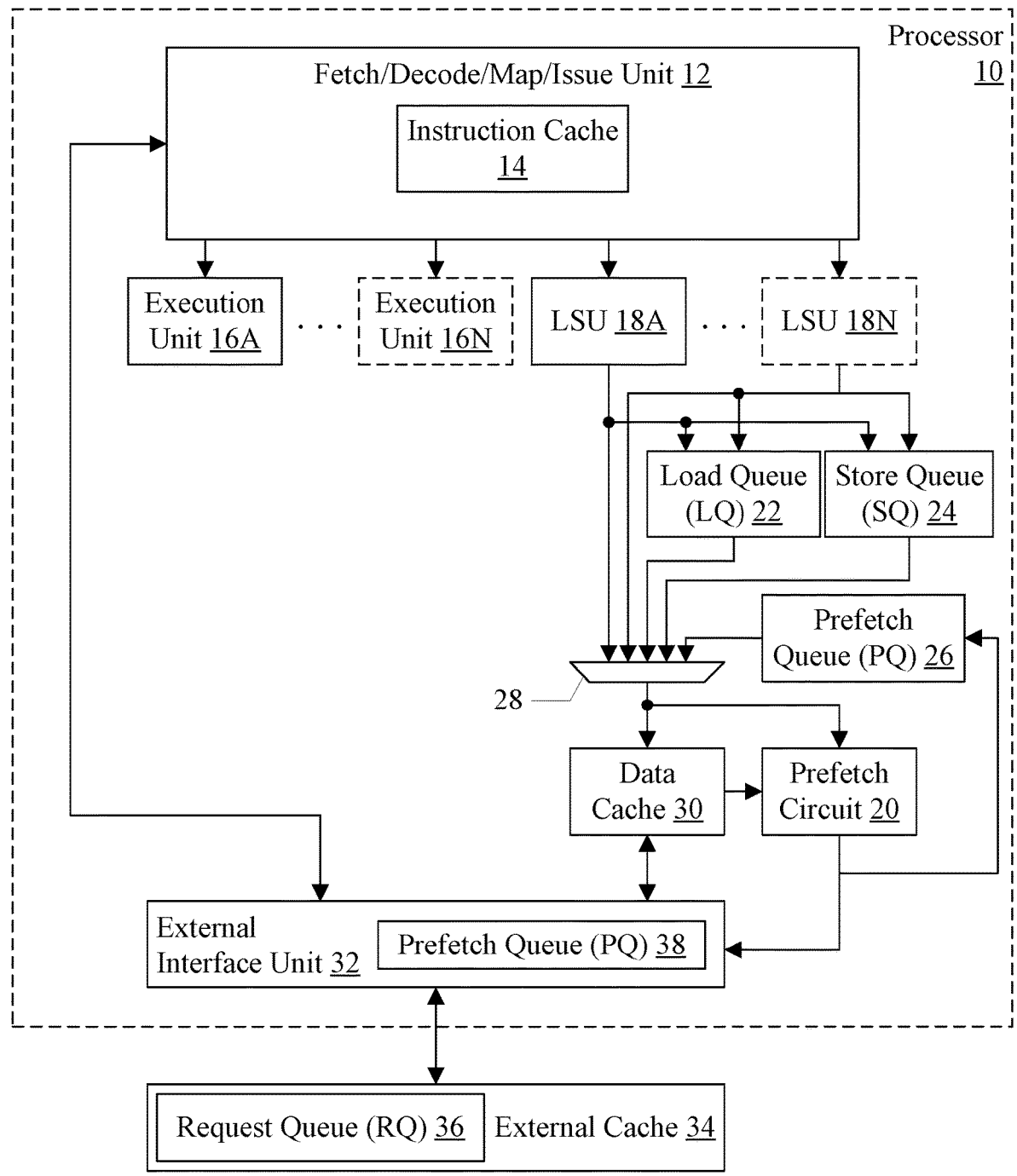
FIG. 1 is a block diagram of one embodiment of a portion of a system including a processor and an external cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Processor Overview

Turning now to FIG. 1, a block diagram of one embodiment of a portion of a system including a processor 10 and an external (to the processor 10) cache 34 is shown. In the embodiment of FIG. 1, the processor 10 may include a fetch/decode/map/issue (FDMI) unit 12 that may include an instruction cache 14. The processor 10 may further include one or more execution units 16A-16N, one or more load/store units (LSUs) 18A-18N, a prefetch circuit 20, a load queue (LQ) 22, a store queue (SQ) 24, a prefetch queue (PQ) 26, a multiplexor (mux) 28, a data cache 30, and an external interface unit 32. The external interface unit 32 may also include a prefetch queue 38. The data cache 30 and the FDMI unit 12 are coupled to the external interface unit 32, which is coupled to communicate external to the processor 10 (e.g. to the external cache 34 and/or to other components of a system including the processor 10). The FDMI unit 12 is coupled to the execution units 16A-16N and the LSUs 18A-18N. The LSUs 18A-18N are coupled to the load queue 22 and the store queue 24, and the prefetch circuit 20 is coupled to the data cache 30 and the prefetch queue 26. The LSUs 18A-18N, the load queue 22, the store queue 24, and the prefetch queue 26 are coupled to the mux 28, which is coupled to the data cache 30 and the prefetch circuit 20.

The FDMI unit 12 may be configured to fetch instructions for execution by the processor 10, decode the instructions into ops for execution, map the ops to speculative resources (e.g. rename registers) to permit out-of-order and/or speculative execution, and issue the ops for execution to the execution units 16A-16N and/or LSUs 18A-18N. More particularly, the FDMI unit 12 may be configured to cache instructions previously fetched from memory (through the external interface unit 32) in the instruction cache 14, and may be configured to fetch a speculative path of instructions for the processor 10. The FDMI unit 12 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The FDMI unit 12 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10 may be decoded into a single instruction operation, and thus the instruction operation may be essentially synonymous with instruction (although it may be modified in form by the decoder). The term "instruction operation" may be more briefly referred to herein as "op." The ops may be mapped to physical registers from the architectural registers used in the instructions, and then scheduled for issue. The scheduling may be centralized in a scheduler, or decentralized in reservation stations, in various embodiments, based on the availability of operands for each op. A register file or files (not shown in FIG. 1) may implement the physical registers of the processor 10. There may be separate physical registers for different operand types (e.g. integer, media, floating point, etc.) in an embodiment. In other embodiments, the physical registers may be shared over operand types.

The execution units 16A-16N may include any types of execution units in various embodiments. For example, the execution units 16A-16N may include integer, floating point, and/or vector execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Vector execution units may be configured to execute vector ops. Vector processing may be characterized by performing the same processing on significant amounts of data, where each datum is a relatively small value (e.g. 8 bits, or 16 bits, compared to 32 bits to 64 bits for an integer). Thus, vector ops often include single instruction-multiple data (SIMD) operations on an operand that represents multiple operand data (a vector of operands). For example, vector data may be ops media data (e.g. image data such as pixels, audio data, etc.).

Thus, each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops.

The LSUs 18A-18N may be configured to execute load/store memory ops. Generically, a memory operation (memory op) may be an instruction operation that specifies an access to memory (although the memory access may be completed in a cache such as the data cache 30 or the external cache 34). Generally, a load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. The LSUs 18A-18N may be configured to perform virtual address generation from various address operands of the load/store ops and may be configured to transmit the ops to the data cache 30 (through the mux 28) and to the load queue 22/store queue 24.

The load queue 22 may be configured to queue load ops that have been executed by the LSUs 18A-18N. The load ops may be queued awaiting cache fills if they miss in the data cache 30 (and/or TLB miss translation fills if translation is enabled). The load ops may be queued for ordering reasons as well. Similarly, the store queue 24 may be configured to queue store ops that have been executed by the LSUs 18A-18N. The store ops may be queue for cache/TLB fills, to await store data from the data source operand, and/or to await non-speculative/retired state to update the data cache 30 and/or memory. In other embodiments, a combined load/store queue may be used. The load queue 22 and the store queue 24 (or a combined load/store queue) may be implemented in the LSUs 18A-18N, but are shown separately in FIG. 1 for convenience and illustrative purposes.

The prefetch queue 26 may store prefetch requests generated by the prefetch circuit 20 to access the data cache 30. The prefetch requests may be generated by the prefetch circuit 20 observing the load/store ops executed by the LSUs 18A-18N. Thus, the prefetch requests may be predicted read requests generated prior to the instruction code being executed by the processor 10 actually requesting the data. Viewed in another way, a prefetch request may be generated as a prediction that one or more subsequently-executed ops will access the prefetched data. In contrast, cache requests by load/store ops may be referred to as demand fetches (or "demand access"), because they are directly specified by the execution of code, rather than predicted. The prefetch requests are thus speculative, and may later be found to be incorrect if the demand fetches do not subsequently access the prefetched data.

In an embodiment, the prefetch circuit 20 may be an implementation of an access map/pattern match (AMPM) prefetcher with various enhancements. The AMPM prefetcher is described in more detail below. The prefetch circuit 20 may monitor the demand fetches/prefetch requests selected through the mux 28 to access the data cache 30, along with cache hit/miss status from the data cache 30, to generate prefetch requests. In an embodiment, the AMPM prefetcher may be a primary prefetch circuit supported by one or more secondary prefetch circuits as described in more detail below. Furthermore, other embodiments may implement other prefetch mechanisms as the primary prefetch circuit.

The data cache 30 may have any capacity and configuration. For example, set associative, fully associative, and direct mapped configurations may be used in various embodiments. The data cache 30 may be configured to cache data in cache blocks, where a cache block is a set of bytes from contiguous memory locations that are allocated and deallocated space in the cache as a unit. The cache blocks may be aligned to a cache block boundary (e.g. a 32 byte cache block may be aligned to a 32 byte boundary, a 64 byte cache block may be aligned to a 64 byte boundary, a 128 byte cache block may be aligned to a 128 byte boundary, etc.). Thus, the address of a byte may be divided into a cache offset portion (the least N significant bits of the address, where $2^N$ is the size of the cache block) and a cache tag portion (the remaining address bits). In an embodiment, the data cache 30 may be virtually indexed and a translation lookaside buffer (TLB, not shown in FIG. 1) may be accessed in parallel to translate the virtual address to a physical address of a memory location in the memory.

Cache misses in data cache 30 and instruction cache 14, as well as translation accesses, non-cacheable accesses, etc. may be communicated to the external interface unit 32. The external interface unit 32 may be configured to transmit transactions to the external cache 34 in response to the various accesses generated in the processor 10. The external interface on which transactions are transmitted may have any form. For example, the external interface may be a shared bus, a point to point interconnect with packetized transactions, a full or partial crossbar, etc.

The external cache 34 may have any capacity and configuration as well. In an embodiment, the external cache 34 may be a level 2 (L2) cache. In another embodiment, the processor 10 may include an L2 cache and the external cache 34 may be a level 3 (L3) cache. The external cache 34 may be any level of cache in a memory hierarchy. The external cache 34 may be inclusive of the data cache 30, non-inclusive of the data cache 30, or exclusive of the data cache 30, in various embodiments. The cache block size in the external cache 34 may be the same size as the cache block size of the data cache 30, or may be a different cache block size (e.g. a larger cache block size).

The request queue 36 may be configured to receive requests from the processor 10 (and potentially other processors in a multiprocessor configuration) to access the external cache 34. The requests may be demand fetches, or may be prefetch requests. The prefetch requests from the prefetch circuit 20 that are targeted at the external cache 34 (as opposed to those that target the data cache 30 and miss) may bypass the data cache 30 and may be enqueued by the prefetch circuit 20 in the prefetch queue 38 for transmission to the external cache 34. Prefetch requests that miss in the data cache 30, as well as demand fetch misses in the data cache 30 and/or the instruction cache 14, may be transmitted as requests by the external interface unit 32 to the external cache 32 as well. Each of these requests may be queued in the request queue 36; and the requests may be serviced by the external cache 34 from the request queue 36. If the requests are a miss in the external cache 34, the requests may be transmitted to other caches and/or a main memory in a system including the processor 10.

The mux 28 may select among its various inputs (the LSUs 18A-18N, the load queue 22, the store queue 24, and the prefetch queue 26) to transmit cache accesses to the data cache 30. Control logic to the mux 28 (not shown in FIG. 1) may arbitrate among the requests using any desired arbitration scheme. The mux 28 may select multiple inputs to access the data cache 30 (and the prefetch circuit 20) concurrently (e.g. up to one per data cache port). In an embodiment, the data cache 30 may include two read ports and two write ports, for example, supporting up to two load ops (and/or store ops performing a hit check) and two store ops per clock cycle. More or fewer ports may be supported.

It is noted that any number and type of execution units 16A-16N may be included in various embodiments, including embodiments having one execution unit and embodiments having multiple execution units. Any number of LSUs 18A-18N may be included in various embodiments as well, including one LSU and multiple LSUs. Additional embodiments that include load units (that execute only load ops) and/or store units (that execute only store ops) may be included with or without LSUs.

Prefetch Circuit

Figure 2:
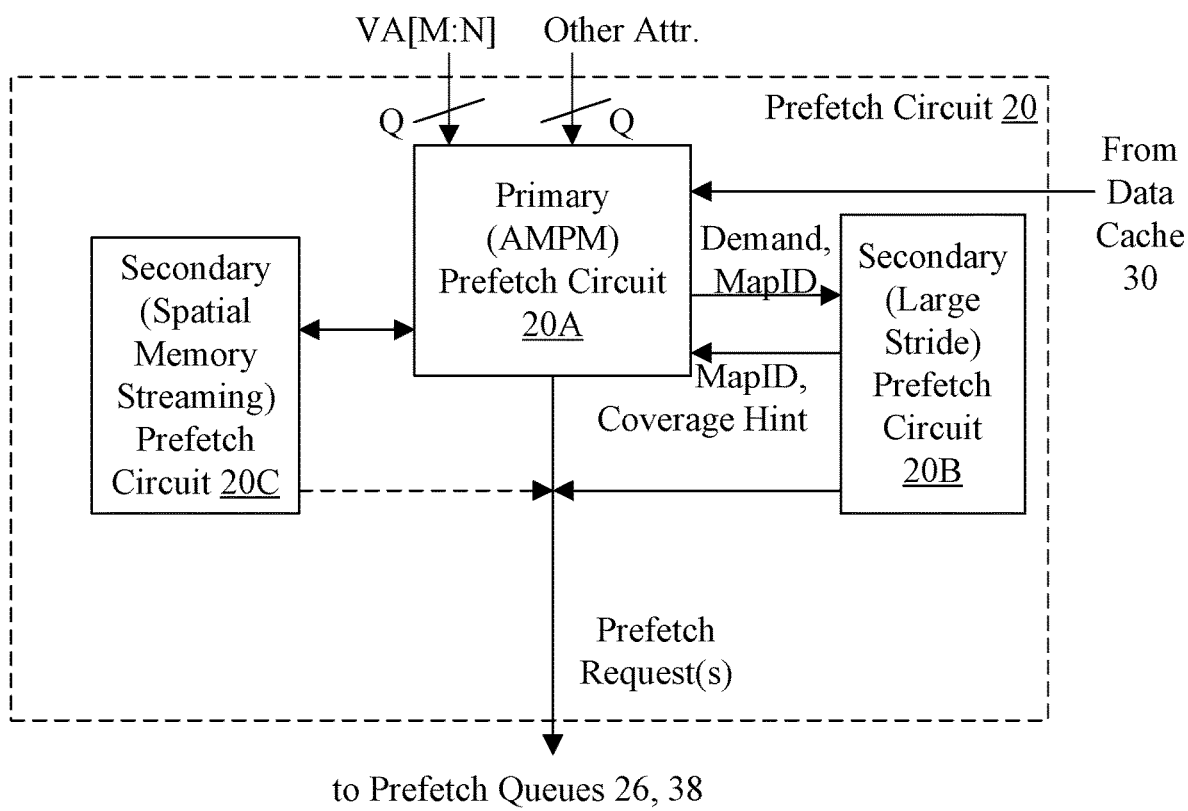
FIG. 2 is a block diagram of one embodiment of a prefetch circuit shown in FIG. 1.

Turning now to FIG. 2, a block diagram of one embodiment of the prefetch circuit 20 is shown. In the illustrated embodiment, the prefetch circuit 20 may include a primary prefetch circuit 20A and one or more secondary prefetch circuits 20B-20C. For example, the secondary prefetch circuits may include a large stride prefetch circuit 20B and/or a spatial memory streaming (SMS) prefetch circuit 20C. The primary prefetch circuit 20A is coupled to the mux 28 to receive data reflecting accesses to the data cache 30 (e.g. up to Q concurrent memory operations from the LSUs 18A-18N, the LQ 22, and the SQ 24) and to the data cache 30. The primary prefetch circuit 20A may be coupled to the secondary prefetch circuits 20B-20C, and may be coupled to the prefetch queues 26 and/or 38 to transmit prefetch requests to the prefetch queues 26/38. The secondary prefetch circuits 20B-20C may be coupled to the prefetch queues 26 and/or 38 as well to transmit prefetch requests, in an embodiment. In one embodiment, the prefetch circuit 20C may or may not generate prefetch requests. For example, the prefetch circuit 20C may provide access maps to the primary prefetch circuit 20A but may not generate prefetch requests of its own accord in an embodiment. In other embodiments, the prefetch circuit 20C may also generate prefetch requests.

The primary prefetch circuit 20A may be the "main" prefetch circuit that may be expected to generate most of the prefetch requests in the processor 10. That is, the prefetch mechanism(s) implemented by the primary prefetch circuit 20A are expected to provide good performance for most workloads executed by the processor 10. The secondary prefetch circuits 20B-20C may be provided to improve the performance of the prefetch circuit 20 overall, for cases that are not as well handled by the primary prefetch circuit 20A. Examples of the primary prefetch circuit 20A and the secondary prefetch circuits 20B-20C are described in more detail below. In general, any prefetch circuits implementing any prefetch mechanisms may be used in various embodiments. The number and type of primary and second prefetch circuits may vary from embodiment to embodiment as well.

The interface between the primary prefetch circuit 20A and the secondary prefetch circuit 20B is shown in greater detail in FIG. 2, for one embodiment. The interface may include a transmission of data indicating a demand access (demand in FIG. 2), along with an identifier (MapID in FIG. 2) that identifies a memory location in the primary prefetch circuit 20A that is allocated to the demand access. The allocated memory location may track prefetch data related to the demand access, which the primary prefetch circuit 20A may use to generate prefetch requests corresponding to the demand access. For example, in an embodiment, the primary prefetch circuit 20A is an AMPM-based prefetch mechanism and the memory location may track an access map that includes the address accessed by the demand access. Thus, the identifier may be the MapID. Other embodiments may implement other access mechanisms and the identifier may thus have a different name. The data accessed by the demand access and the data accessed by subsequent demand accesses which hit the prefetched data from prefetch requests generated in response to the demand access may be part of a data stream. The prefetch data associated with the demand access may thus be attempting to predict the data in the data stream, prior to the subsequent demand accesses being generated.

The interface may further include a transmission (e.g., a return) of the identifier (MapID) and a coverage hint when the secondary prefetch circuit 20B has reached a certain confidence level in the prefetching of the demand access. The primary prefetch circuit 20A may use the identifier to locate the corresponding memory location in the primary prefetch circuit 20A and update the memory location to limit the number of prefetches generated corresponding to the demand access (e.g. from the corresponding map). In an embodiment, the coverage hint may indicate the coverage of the secondary prefetch circuit 20B. The coverage may refer to how many of subsequent demand accesses related to the original demand access are covered by the prefetch requests generated by the secondary prefetch circuit 20B. That is, the coverage may refer to how many of the subsequent demand accesses are cache hits due to the prefetch requests. In some cases, subsequent demand accesses may hit the prefetch requests before they complete, and these demand accesses may also be counted as prefetch hits for coverage purposes, in an embodiment. Subsequent demand accesses that hit prefetch requests may be delayed until the prefetch requests complete, but the delay is less than the delay if the demand accesses were misses. The subsequent demand accesses may be related to the original demand access if they are part of the same data stream learned by a given prefetch circuit from the original demand access. For example, the subsequent demand accesses may be part of the same access map in an AMPM-based prefetch circuit. The subsequent demand accesses may be separated by the stride learned by a stride-based prefetch circuit.

The coverage hint may be a relative indication, rather than an absolute. For example, the coverage hint may indicate partial coverage if the prefetch circuit is accurately predicting more than a threshold number of the overall demand accesses in the data stream, but less than a second threshold number. The coverage hint may indicate full coverage if the prefetch circuit is accurately predicting more than the second threshold number, where the second threshold may be nearly all of the overall demand accesses. The coverage may be measured in any desired fashion (e.g. numbers over a window of most recent demand accesses, percentages of demand accesses, etc.). Thus, for example, partial coverage may be measured as at least 50% of the demand accesses or at least 75% of the demand accesses. Full coverage may be measured as at least 90% or at least 95% of the demand accesses in the example. Additionally, a coverage hint of none may be supported, which may indicate that the coverage from the secondary prefetch circuit is not deemed to be effective (e.g. less than the lower threshold of partial coverage, or an even lower threshold).

AMPM Prefetch Circuit

Figure 3:
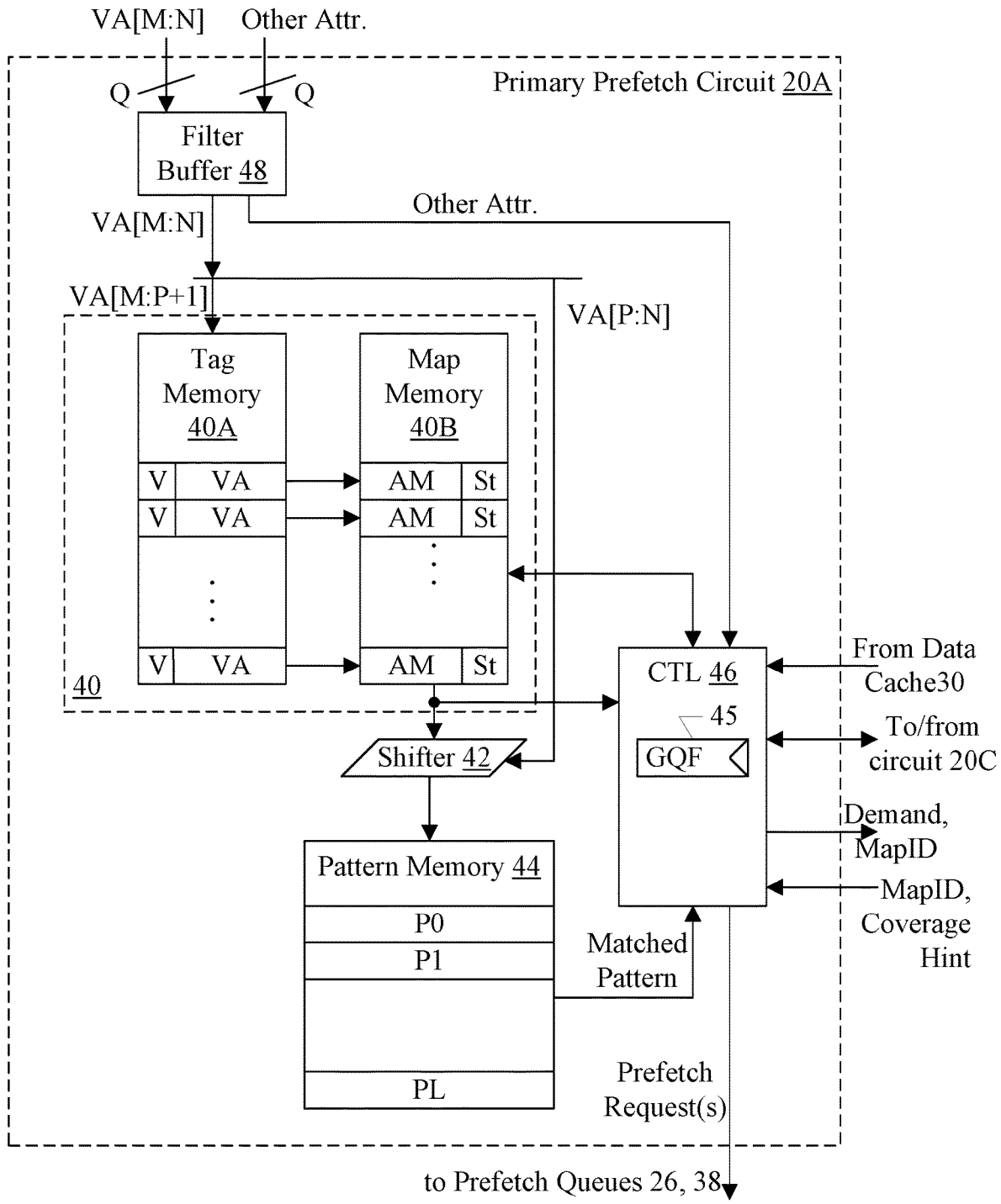
FIG. 3 is a block diagram of one embodiment of a primary prefetch circuit shown in FIG. 2.

Turning now to FIG. 3, a block diagram of one embodiment of the primary prefetch circuit 20A is shown. In the illustrated embodiment, the primary prefetch circuit 20A includes an access map memory 40, a shifter 42, an access pattern memory 44, a control circuit 46, and an input filter buffer 48. The control circuit 46 includes a register 45 storing a global quality factor (GQF).

The filter buffer 48 may receive the Q concurrent memory operations as mentioned above with regard to FIG. 2. Q may be an integer greater than 1 (e.g. 4, in the above example in which the data cache has 4 ports). The filter buffer 48 may capture information from the operations for presentation to the access map memory 40 and the control circuit 46. The filter buffer 48 may be configured to merge multiple memory operations to the same access map and present the operations to the access map memory 40, the shifter 42, and the control circuit 46. In the illustrated embodiment, the filter buffer 48 may be configured to present one operation per clock cycle, although other embodiments may be configured to present more operations in parallel, but less than Q operations. The size and complexity of the memory structures and circuitry in the primary prefetch circuit 20A to support concurrent operations may be reduced through use of the filter buffer 48.

Additionally, in an embodiment, the filter buffer 48 may be an allocation filter for the memory 40. Some access maps may have an initial access, but may not be accessed again until they are evicted from the memory 40. Such maps cause other maps to be evicted, which may remove a map that is causing accurate prefetching to store a map that may not cause any prefetching. The filter buffer 48 may transmit accesses to the map memory 40, and if an access is a miss, may retain the access in the filter buffer 48. If a subsequent access to the same access map as the retained access is detected by the filter buffer 48, the map may be allocated to the memory 40 at that point. In an embodiment, a hysteresis counter may be implemented for each retained access and the number of accesses to occur prior to map allocation may be greater than two. In an embodiment, the number of accesses may be programmable, which may allow for tuning of the amount of filtering.

The filter buffer 48 may capture the virtual address (or a portion thereof) from each memory operation as well as various other attributes that may be used by the primary prefetch circuit 20A. For example, the primary prefetch circuit 20A may receive a physical address to which the virtual address translates. The physical address may actually be received later in time than the virtual address, and may be updated into the access map memory 40. The physical address may be used for prefetches to lower level caches such as the external cache 34, which may be physically addressed. The data cache 30 may be virtually addressed, in some embodiments.

The access map memory 40 and the shifter 42 are coupled to receive the virtual address of an access launched from the filter buffer 48 (or portions of the virtual address, as shown in FIG. 3), and the output of the access map memory 40 is coupled to the shifter 42. The control circuit 46 is coupled to the access map memory 40 and to the access pattern memory 46. The control circuit 46 may be configured to provide prefetch requests to the prefetch queues 26 and 38, and may be configured to receive cache hit/miss information from the data cache 30. The shifter 42 is coupled to the access pattern memory 44. In the illustrated embodiment, the access map memory 40 includes a tag memory 40A and a map memory 40B.

The primary prefetch circuit 20A may be an implementation of an AMPM prefetcher. The access map memory 40 may store multiple access maps covering various access regions in the virtual address space. The access maps may represent the accesses to the cache blocks in the respective access regions. When another access hits on an access map in the access map memory 40, the access map may be output and compared to various access patterns stored in the access pattern memory 44. If a match between a given access pattern and the access map is detected, prefetch requests indicated by the matching pattern may be generated. The access patterns may be determined from trace analysis performed on various code sequences expected to be executed by the processor 10 during use. Given a certain pattern of demand accesses and/or successful prefetches, for example, one or more prefetches may be predicted based on the trace analysis. The access patterns may be identified during design of the processor 10 and hardcoded into the access pattern memory 44. Alternatively, some or all of the access patterns may be programmable in the access pattern memory 44 and may be written to the access pattern memory 44 during initialization of the processor 10 (e.g. at reset) or at some other convenient time.

As mentioned above, the access map 40 may store multiple access maps covering various access regions in the virtual address space. The access region may be a region of the virtual address space that includes multiple contiguous cache blocks. The access region may be aligned to a boundary determined by the size of the access region. For example, if access regions cover 2 kilobytes (kB) each, then the access regions are aligned to 2 kB boundaries. The access regions may be any desired size. For example, 4 kB access regions may be defined. Generally, an access map may be a record of various cache accesses that have occurred to the cache blocks within the access region. Each cache block within the access region may have an associated symbol in the access map, indicating the type of access that has occurred. In one embodiment, accesses may include demand-accessed (symbol A), prefetched to data cache 30 (symbol P), prefetched to another level cache (L), successful prefetch (symbol S), or invalid (symbol "."). Each symbol may be represented by a different code of a value stored for the cache block in the access map. Thus, three bits per cache block may be stored based on the above symbols. Other embodiments may implement a subset or all of the above symbols along with additional symbols (e.g. symbols for multiple lower level caches, in-progress operations, etc.).

A demand-accessed cache block may be a cache block that was accessed without having been prefetched in advance. Thus, a load or store to the cache block may have been executed, and may have missed in the data cache 30. A prefetched (P) cache block may be a cache block that was predicted to be accessed by the primary prefetch circuit 20A, which generated a prefetch request that passed through the prefetch queue 26 and was presented to the data cache 30. Alternatively, the prefetched cache block may have had a prefetch request generated and inserted into the prefetch queue 26, but may or may not have been presented to the data cache 30. A prefetched (L) cache block may be a cache block that was predicted to be accessed by the primary prefetch circuit 20A, which generated a prefetch request to another level of cache (e.g. external cache 34). The prefetch request for an L symbol may be transmitted to the other level of cache without passing through data cache 30, in an embodiment. In other embodiments, data cache 30 may be checked for a hit for a prefetch request for an L symbol. In either case, the data (prefetched from either the memory system or a level of cache between than the external cache 34 and the memory system) may be written to the external cache 34 rather than the data cache 30. A subsequent miss or prefetch to the data cache 30 may result in a hit in the external cache 34. A successfully prefetched cache block may be a cache block that was prefetched (either to the data cache 30 or the external cache 34), and was subsequently demand-accessed (and thus the demand access was a cache hit in the data cache 30 and/or the external cache 34). A successfully prefetched cache block may thus be an accurately prefetched cache block, since it was accessed. An invalid cache block in the access map may be a cache block that has not been accessed.

In an embodiment, there may be "prefetch in progress" symbols for each of the P and L symbols as well, indicating that a prefetch request has been generated but is not yet completed. It is noted that, while different prefetch symbols are provided in the access maps (and pattern maps), other embodiments may support prefetch requests to more than two levels of cache. An additional prefetch symbol may be added for each cache level.

The virtual address (VA) of the data cache access (not including the N least significant bits of the address, bits N−1:0, where $2^N$ is the size of a cache block) may be input to the primary prefetch circuit 20A. The least significant P-N bits of the virtual address provided to the primary prefetch circuit 20A may be an offset within the access map to the cache block being accessed. Thus, the access maps may cover $2^{P+1}$ bytes. The remainder of the virtual address, bits M:P+1, may be a tag that may be compared to the tags in the tag memory 40A.

The tag memory 40A may include multiple entries, each entry storing a tag for a corresponding access map in the map memory 40B. In an embodiment, the access map memory 40 may be fully associative and thus the tag memory 40A may be content addressable memory (CAM). If a match is detected between the VA tag input to the access map memory 40 and an entry in the CAM 40A (and the valid bit is set), a hit is detected on the entry. A corresponding entry in the map memory 40B (e.g. a random access memory, or RAM) may be output by the access map memory 40 to the shifter 42. Each entry in the map RAM 40B may include the access map (symbols for each cache block in the access region, labeled AM in FIG. 3) and may optionally include state associated with the access map (labeled St in FIG. 3). Exemplary state for various embodiments will be described in more detail below.

The access patterns in the access pattern memory 44 may be centered on an access point, which may be in approximately the center of the access pattern. That is, the access point may be one position to the right or the left of the exact middle of the access pattern, since the access pattern may be an even number of symbols long and the exact middle is between the two symbols. If the access pattern is an odd number of symbols, the access point may be the center of the pattern. By placing the access point in the center, the patterns may permit both forward and reverse patterns of accesses to be detected. A forward pattern may be progressing at increasingly larger offsets within the access map (viewing the access map offset as a number), whereas a reverse pattern may be progressing at decreasingly smaller offsets. Furthermore, matches to symbols on both sides of the access point may be permitted to capture unusual access patterns.

Based on the access map offset of the input VA, the shifter 42 may shift the access map to align the current access point of the access map to the access point in the pattern memory 44. The shifted access pattern may be provided to the access pattern memory 44, which may compare the shifted access pattern to the patterns. The access pattern memory 44 may thus be a read-only memory (ROM) with comparison circuitry, a CAM, or a combination of ROM and CAM if some access patterns are hardcoded and others are programmable. If a pattern is matched, the matched pattern may be output by the access pattern memory 44 to the control circuit 46. The control circuit 46 may be configured to generate one or more prefetch requests based on the matched pattern and may transmit the prefetch requests to the prefetch queue 26.

In the illustrated embodiment, the access pattern memory 44 may include L+1 entries, storing L+1 access patterns labeled P0 to PL in FIG. 3. In an embodiment, the generated prefetch requests may include a pointer indication indicating whether or not pointer read activity in the access map has been observed and should be included in determining prefetches. In an embodiment, the access map and/or the matched pattern may be provided with the prefetch request as well, for the prefetch circuit 36.

A given access map may match more than one pattern in the pattern memory 44. Longer patterns (patterns having the most demand-accessed and/or successfully prefetched cache blocks) may be more likely to generate accurate prefetches. In an embodiment, the patterns in the pattern memory 44 may be sorted so that the longer patterns are nearest one end of the memory (e.g. the "top", where pattern P0 is stored, or the "bottom", where pattern PL is stored). The pattern memory 44 may include a priority encoder that selects the match nearest the top, or nearest the bottom, if there is more than one match. In this manner, the longest pattern that is matched may be naturally selected from the pattern memory 44 and provided to the control circuit 46. Other embodiments may not necessarily order the patterns as discussed in this paragraph, but may still output the longest pattern that is matched by the access map.

In addition to generating the prefetch requests, the control circuit 46 may be configured to update the hitting access map in the access map memory 40. The update may, in some cases, be affected by the cache hit/miss result and thus the cache hit/miss from the data cache 30 may be received by the control circuit 46. In the event of a miss on the access map memory 40, the primary prefetch circuit 20A may allocate an access map entry to the virtual address and may begin tracking the access map in the allocated entry.

In some embodiments, one or more default patterns may be supported (referred to as "density patterns"). Density patterns may include one A symbol at the access point, and prefetch symbols. Since the access point is automatically an A, the density patterns match if no other pattern matches. The density patterns may presume the nearby cache blocks are good prefetch candidates, and thus may include prefetch symbols nearby. To avoid potentially polluting the nearest caches to the processor 10, density patterns may include prefetch symbols for the furthest level cache (from the processor 10) to which prefetch is supported, in an embodiment. Backward density patterns may be supported as well in some embodiments.

The control circuit 46 may also be configured to communicate with the secondary prefetch circuits 20B-20C. More particularly, the control circuit 46 may be configured to transmit the MapID and demand access information to the large stride prefetch circuit 20B. The MapID may identify the entry the access map memory 40 (e.g. the entry in the tag memory 40A and corresponding entry in the map memory 40B) allocated to the demand access. If the MapID is returned by the large stride prefetch circuit 20B, the control circuit 46 may be configured to update the identified entry based on the coverage hint.

Figure 4:
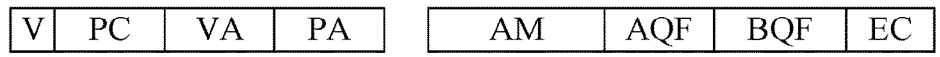
FIG. 4 is a block diagram illustrating one embodiment of an access map entry.

An example access map memory entry 50 is illustrated in FIG. 4, which shows the virtual address tag (VA), the physical address (PA), the PC of the initial instruction to touch the access map, the access map (AM), a pair of quality factors, and an external coverage (EC) field.

The EC field may be updated in response to the large stride prefetch circuit 20B returning the MapID for the entry 50. The EC field may include at least a bit to indicate whether or not the entry 50 is externally covered (that is, the large stride prefetch circuit 20B is accurately prefetching the demand accesses associated with the map). The control circuit 46 may reduce the number of prefetch requests generated in response to the EC field indicating that the map is externally covered, compared to the number of prefetch requests that would have been generated via other controls (e.g. the quality factors, including the global quality factor, the length of the matching map, etc.). In some embodiments, the EC field may record the coverage hint mentioned previously. For example, one encoding may indicate no coverage (or "none," and none may be the initial value of the entry), another encoding may indicate partial coverage, and still another encoding may indicate full coverage. In other embodiments, the full coverage encoding is not used, or the partial coverage encoding is not used.

A quality factor may be a value that measures or estimates the effectiveness of the prefetching for the corresponding access map. The quality factor may be used to further limit or prevent prefetching (above what the pattern itself already limits) when the effectiveness is not high. Additionally, in some embodiments, the quality factor may be used to "meter" prefetching that is effective but that is being consumed slowly. That is, using the quality factor to limit the prefetching may result in prefetched data being delivered closer to the time at which the data will be consumed by demand fetches. The scheduling of memory accesses in the memory system may be more efficient in some cases, since the prefetch traffic may be less bursty and thus the congestion in the memory system may be lower.

Prefetching may be "effective" if it results in a reduction of average memory latency for memory operations performed by the processor 10, as compared to when no prefetching is performed. The effectiveness may thus take into account both prefetch accuracy (how often a prefetch is consumed by a demand fetch) and any adverse effects that the prefetching may have (e.g. by causing another cache block to be evicted from the data cache 30 or another level cache to make room for the prefetched cache block, and the evicted cache block is later accessed by a demand access). In other embodiments, accuracy of the prefetching may be measured by the quality factors.

A pair of quality factors may be used to control prefetch request generation for the data cache 30 and the external cache 34 somewhat independently. The accuracy quality factor (AQF) may control the prefetch generation for the data cache 30 and the bandwidth quality factor (BQF) may control the prefetch generation for the external cache 34. Other embodiments which employ prefetching at more than two levels may employ a quality factor for each level.

Furthermore, the global quality factor may be used to limit the amount of overall prefetching across the access maps in the memory 40. When the global quality factor is low, the primary prefetch circuit 20A may operate in a more efficient mode, generating fewer prefetch requests overall until the global quality factor recovers. The global quality factor may be used because, even though the AQF and BQF may be used to control prefetches from a given entry in the memory 40, there may be many entries and thus a large number of prefetch requests may still be generated at certain times (e.g. early in the execution of a workload, when many new access maps may be allocated). The global quality factor (GQF) may be maintained by the control circuit 46 (e.g. in the register 45 shown in FIG. 3).

As mentioned above, longer access patterns may tend to be more accurate in predicting prefetches, and so the quality factor may not be used if the access map length exceeds a threshold, in some embodiments. In some embodiments, the override of the quality factor may apply only to the AQF/BQF for the entry. That is, the GQF may still prevent the generation of a prefetch request even if the length of the access pattern indicates that the AQF/BQF should be overridden. The threshold may be fixed or programmable in the prefetch circuit, in some embodiments. Different threshold levels may be used for different cache levels (e.g. higher thresholds for lower levels). In another embodiment, access maps longer that a specified length, e.g. the length that overrides the AQF/BQF or a longer length, may override the GQF as well and may be permitted to generate additional prefetch requests.

In one embodiment, the GQF may determine one of two modes: efficient mode and performance mode. Other embodiments may implement more than two modes based on various ranges of GQF. If GQF is low (e.g. below a certain predetermined or programmable threshold), the primary prefetch circuit 20A may be in efficient mode. If the GQF is high (e.g. above the threshold), the primary prefetch circuit 20A may be in performance mode. In some embodiments, there may be hysteresis around the threshold to avoid frequent mode changes when the GQF remains near the threshold for a period of time. That is, the GQF may fall below the threshold by a certain amount before switching from performance mode to efficient mode. Similarly, the GQF may rise above the threshold by a certain amount before switching from efficient mode to performance mode.

In the efficient mode, less AQF/BQF may be provided to a newly-allocated access map than in performance mode (e.g. fewer credits, as discussed below). Thus, in efficient mode, fewer prefetch requests may be generated per access map because the AQF/BQF may be consumed and additional prefetch requests may be prevented until the AQF/BQF are restored (e.g. via successful prefetch). In one embodiment, only AQF is allocated on initial map allocation and thus the mode may determine the amount of initial AQF provided to the access map.

Implementing the GQF in the above fashion may permit well-performing access maps that accumulate AQF/BQF through accurate prefetching to continue to generate prefetch requests at higher rates in efficient mode, while newly-allocated maps may be more constrained since they have not been proven to be as accurate as the successful maps with higher AQF/BQF.

In an embodiment, the quality factor may be a token-based or credit-based mechanism. The tokens/credits may represent an allowable amount of outstanding prefetching. Accordingly, tokens/credits may be consumed when a prefetch request is generated (and a prefetch request may only be generated if sufficient tokens/credits are available). A successful prefetch may return tokens/credits to the quality factor value. In an embodiment, a successful prefetch may return more tokens/credits than the generation of a prefetch request consumes, and the passage of time may not return tokens/credits. Alternatively, a more equal return of credits to credits consumed may be used, and the passage of time may also return tokens/credits to the quality factor.

Large Stride Prefetch Circuit

Figure 5:
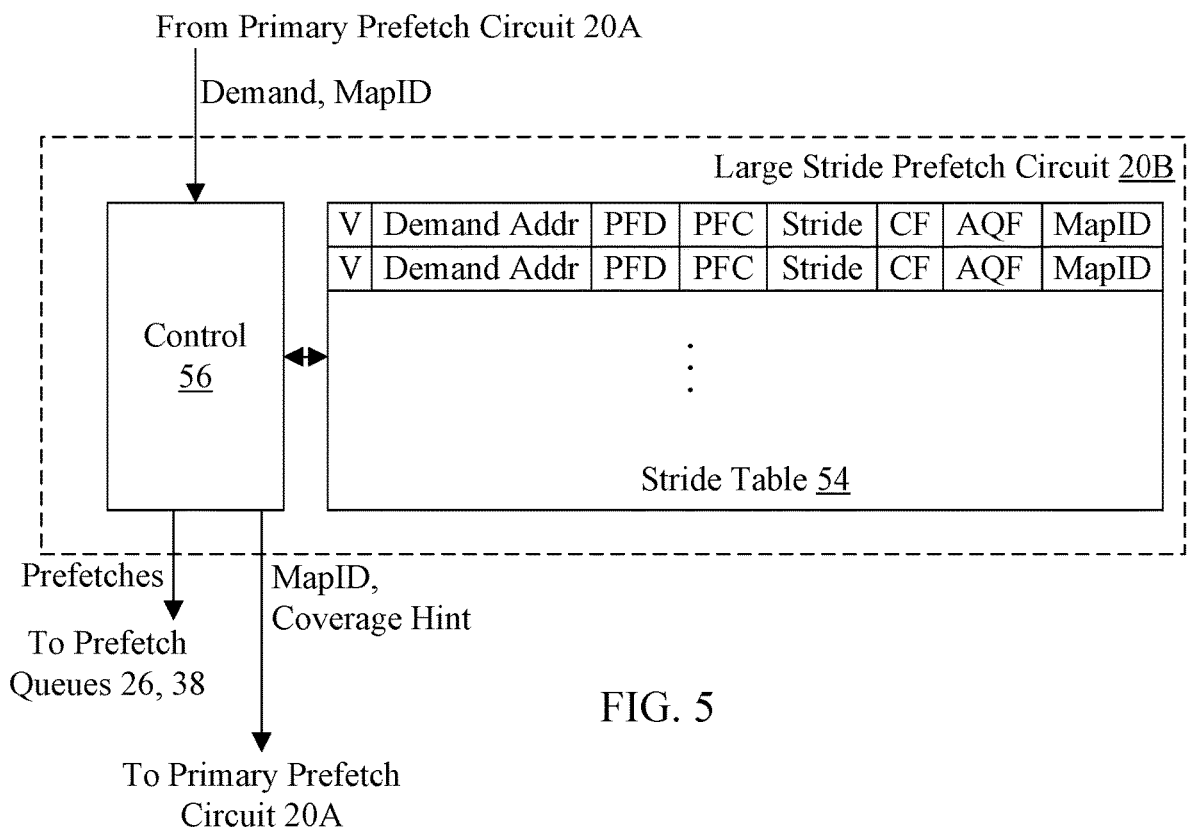
FIG. 5 is a block diagram illustrating one embodiment of a large stride prefetch circuit shown in FIG. 2.

Turning now to FIG. 5, a block diagram of one embodiment of the large stride prefetch circuit 20B is shown. In the illustrated embodiment, the large stride prefetch circuit 20B may include a control circuit 56 and a stride table 54. The control circuit 56 is coupled to the stride table 54, to the primary prefetch circuit 20A, and to the prefetch queues 26 and/or 38 to provide prefetch requests.

The control circuit 56 may receive demand accesses from the primary prefetch circuit 20A and may detect various streams of strided access patterns in the demand accesses. The control circuit 56 may not receive all demand accesses. For example, in an embodiment, the control circuit 56 may receive demand accesses that miss in the primary prefetch circuit 20A (and thus may be the start of a new stream). In an embodiment, the control circuit 56 may also receive demand accesses for access maps that match strided access patterns.

The stride table 54 may have multiple entries to detect various stride streams. Each entry may include a valid bit (V) indicating whether or not the entry is tracking a potential (or confirmed) stream. The demand address field (Demand Addr) may be the most recent demand address that is considered to be part of the stream. The prefetch degree (PFD) may be the degree of the most recently generated prefetch request from the demand address (e.g. the number of strides that the most recently generated prefetch request is ahead of the most recent demand address). The pending prefetch count (PFC) field may be a count of the number of prefetch requests that may be launched but which have not yet been launched. The stride field may store the stride for the entry, and the confidence factor (CF) may store a confidence value in the stride (e.g. a counter that may be incremented each time the stride is confirmed and decremented if the stride appears to change, saturating at maximum and minimum values). An accuracy quality factor (AQF) may be maintained similar to the AQF described above for the primary prefetch circuit 20A as well. Additionally, the MapID issued by the primary prefetch circuit 20A with the demand access that initialized the entry may be stored in the entry.

Strided stream detection may be performed by comparing the demand accesses to the streams being tracked in the stride table 54. For example, the address of a demand access can be detected as being part of a confirmed-stride stream (a stream in which the stride has been calculated and at least one additional address matching the stride has been detected), and the demand access may cause the confidence of the stream to be increased (the CF field of the entry may be the confidence counter for the entry). For a stream that had not yet had a stride detected, the most recent demand address may be subtracted from the received demand address to detect a potential stride, which may be written to the stride field of the entry (and the received demand address may be written to the demand address field). If a stride has been previously detected but not confirmed, the calculated stride may be compared to confirm the stride.

Once the confidence value of a given stride has exceeded a threshold value, the control circuit 56 may return the MapID from the entry to the primary prefetch circuit 20A, along with a coverage hint. To support multiple coverage hints of different sizes, multiple thresholds may be implemented. For example, a confidence value of one greater than the confidence that causes the large-stride prefetch circuit 20B to issue prefetches (having confirmed the stride) may be used as a threshold for the "partial coverage" coverage hint. The saturated maximum value for the confidence value may be used as a threshold "full coverage" coverage hint (or a value slightly less than the saturated maximum value, such as one or two less, may be used). Other embodiments may use other thresholds. In addition to the confidence value, the stride may be checked to ensure that it is large enough that the large stride prefetch circuit 20B may actually generate prefetch requests, as discussed below.

The large stride prefetch circuit 20B may detect strides of various sizes, but may not generate prefetch requests for streams that may be handled by the primary prefetch circuit 20A. For example, strides that will permit multiple accesses to be detected by a given access pattern may be handled by the primary prefetch circuit 20A. However, strides that are larger than about ½ of the access map size, for example, may not be handled by the primary prefetch circuit as the next access may not be within the access map. In an embodiment, the large stride prefetch circuit 20B may generate prefetch requests for strides that are ½ of the access map size and one or more multiples of 2 of that stride size.

In one embodiment, the control circuit 56 may implement sleep circuitry to save power when the large stride prefetch circuit 20B is not generating prefetch requests, or not generating prefetch requests very often. For example, the control circuit 56 may monitor for a continuous time period of no prefetch generation. Alternatively, idle cycles may decrement a counter and prefetch generation may increment a counter. Sleep may occur if the counter reaches zero. The increments and decrements may be of different sizes, in an embodiment. Once sleep has been initiated, a sleep counter may be initialized and the large stride prefetch circuit 20B may sleep for the period indicated by the sleep counter.

Flowcharts

Figure 6:
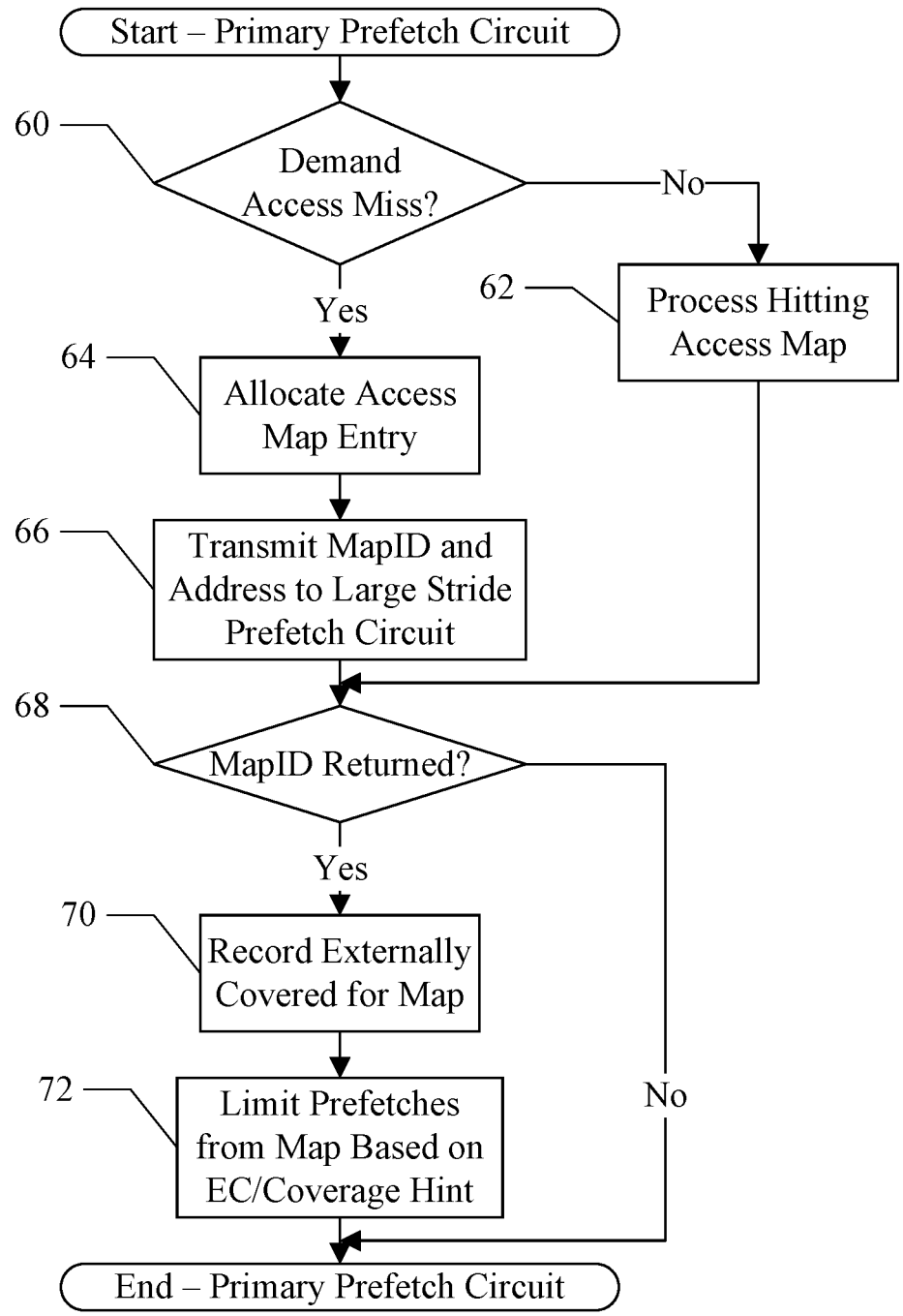
FIG. 6 is a flowchart illustrating certain operation of one embodiment of the primary prefetch circuit shown in FIGS. 2 and 3.
Figure 7:
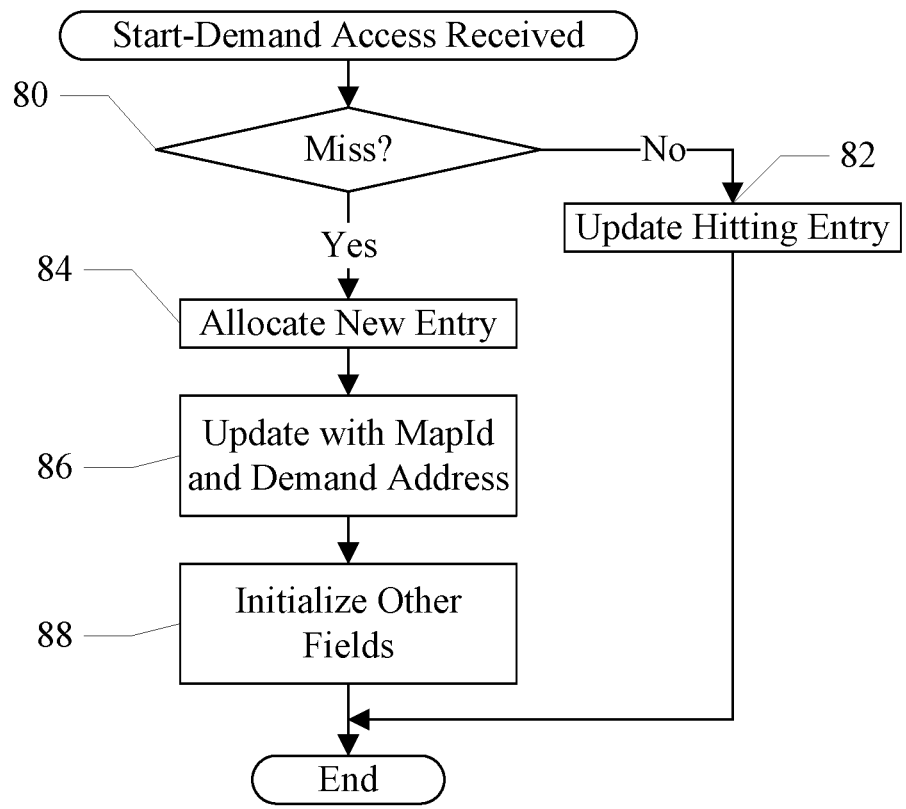
FIG. 7 is a flowchart illustrating operation of one embodiment of the large stride prefetch circuit shown in FIG. 2 is response to a demand access from the primary prefetch circuit.
Figure 8:
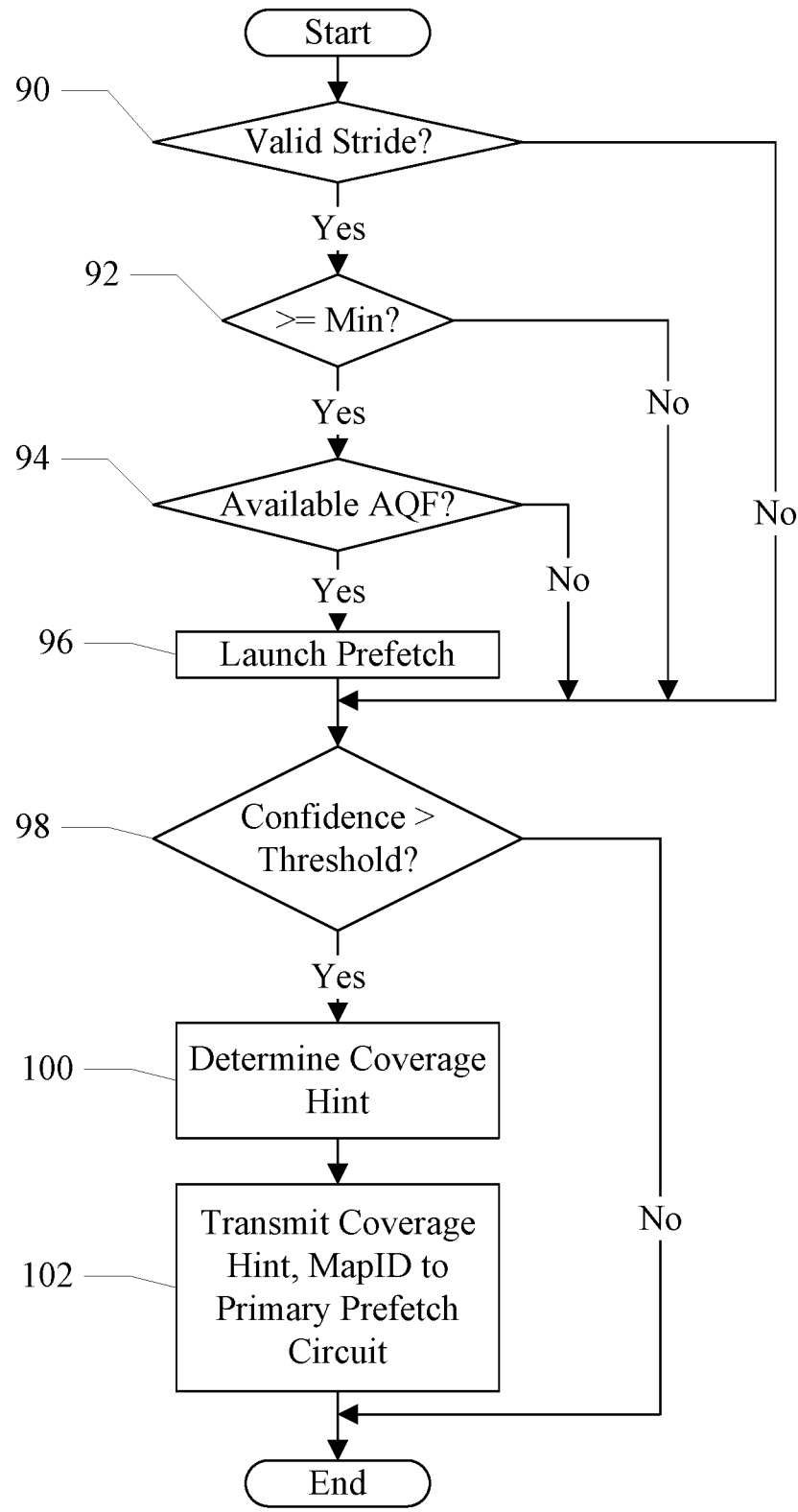
FIG. 8 is a flowchart illustrating generation of a prefetch from the large stride prefetch circuit and coverage reporting to the primary prefetch circuit for one embodiment.

FIGS. 6-8 are flowcharts illustrating operation of one embodiment of the primary prefetch circuit 20A and one embodiment of the large stride predictor circuit 20B. while the blocks are shown in a particular order for ease of understanding, other orders may be used. Blocks may be performed in parallel in combinatorial logic in the prefetch circuits 20A-20B. Blocks, combinations of blocks, and/or the flowchart as whole may be pipelined over multiple clock cycles. The prefetch circuits 20A-20B may be configured to implement the operation shown in the flowcharts.

FIG. 6 is a flowchart illustrating certain operation of one embodiment of the primary prefetch circuit 20A. The primary prefetch circuit 20A may receive a demand access (that has been filtered through the filter buffer 48, in an embodiment). The primary prefetch circuit 20A may determine if the demand access is a hit or miss in the prefetch memory within the primary prefetch circuit 20A (e.g. the access map memory 40, in the embodiment of FIG. 3). If the demand access is a hit (decision block 60, "no" leg), the primary prefetch circuit 20A may process the hitting access map as discussed above for the AMPM mechanism (block 62). Other embodiments implementing other prefetch mechanisms may process the hit according to the implemented prefetch mechanism.

If the demand access is a miss (decision block 60, "yes" leg), the primary prefetch circuit 20A may allocate a memory location in the prediction memory (e.g. an entry in the access map memory 40) for the demand access (block 64), and may transmit the identifier of the allocated entry (e.g. the MapID) and data related to the demand access (e.g. the address accessed by the demand) to the secondary prefetch circuit 20B (e.g. the large stride prefetch circuit 20B in this embodiment) (block 66).

The primary prefetch circuit 20A may also monitor the interface from the secondary prefetch circuit 20B for a return of the identifier (MapID) to indicate that the secondary prefetch circuit 20B is successfully prefetching the data stream corresponding to the demand access (decision block 68). If the MapID is returned (decision block 68, "yes" leg), the primary prefetch circuit 20A may update the memory location in the prediction memory (e.g. the access map) to record that the data stream is externally covered (block 70). In embodiments that provide a coverage hint, the coverage hint may be recorded in the EC field. The primary prefetch circuit 20A may limit the number of prefetches generated from the memory location (e.g. from pattern matches to the access map) based on the externally covered indication and/or the coverage hint (block 72). In one embodiment, the limit may be a programmable maximum and the primary prefetch circuit 20A may generate the number of prefetches indicated by the matched pattern field, up to the maximum number. In an embodiment, the primary prefetch circuit 20A may also ignore the prefetch limit if the matching pattern length (the number of previous accesses in the pattern) is greater than another programmable amount. If the pattern length is long, then the access map is accurately generating a significant number of prefetches and thus prefetching from the access map may continue even though the secondary prefetch circuit 20B is also generating accurate prefetches. In an embodiment, a limit of 3 for the programmable maximum may be selected, and a programmable amount for the pattern length of 4 may be selected. However, other values higher or lower than the example values may be programmed in other embodiments. The limit may generally be a non-zero value (permitting some prefetching by the primary prefetch circuit 20A) but may be less than another number of prefetches that would otherwise be generated by the prefetch mechanism. The limit may be a different value based on different coverage hints as well. For example, a coverage hint of "full coverage" may cause a termination of prefetching by the primary prefetch circuit 20A (e.g. a limit of zero), while a coverage hint of "partial coverage" may cause a non-zero limit as described above. In an embodiment, providing a non-zero limit may allow the primary prefetch circuit 20A and the secondary prefetch circuit 20B to cooperate. For example, in some cases, the demand accesses may read several consecutive cache blocks at each stride predicted by the large stride predictor. The primary prefetch circuit 20A may prefetch the consecutive cache blocks (and possibly some extra cache blocks, but a limited number) at each stride location, and the large stride predictor may accurately initiate the next stride.

FIG. 7 is a flowchart illustrating operation of one embodiment of the secondary prefetch circuit 20B (e.g. the large stride predictor 20B, in one embodiment) in response to receiving a demand access from the primary prefetch circuit 20A. The secondary prefetch circuit 20B may compare the demand access (e.g. the address of the demand access) to the prefetch data maintained by the secondary prefetch circuit 20B (e.g. in a prefetch memory) to determine if the demand access is a hit in an existing stream being prefetched by the secondary prefetch circuit 20A. That is, the secondary prefetch circuit 20B may determine if the demand access is part of an existing prefetch data stream. If the demand access is a hit (decision block 80, "no" leg), the secondary prefetch unit 20B may update the hitting memory location with the address (block 82). The hit may cause the confidence to be increased for the hitting memory location, which may result in generation of more prefetches and/or a return of the MapID to the primary prefetch circuit 20A to indicate that the secondary prefetch circuit 20B is effectively prefetching the map.

If the demand access is a miss (decision block 80, "yes" leg), the secondary prefetch circuit 20B may allocate an entry (memory location) in the prefetch memory to the demand access (block 84). The secondary prefetch circuit 20B may update the allocated entry with the demand address and the MapID (block 86), and possibly other information associated with the demand access as well. Other fields of the entry may be initialized (e.g. the confidence factor may be initialized to a low level of confidence).

FIG. 8 is a flowchart illustrating one embodiment of generation of a prefetch request by the secondary prefetch circuit 20B implemented as the large stride prefetch circuit 20B (and more particularly by the control circuit 56 in an embodiment). The operation in FIG. 8 illustrates the determination of whether or not a given entry in the stride table 54 is ready to launch a prefetch. If multiple entries are ready to launch a prefetch, any mechanism may be used to select among the ready entries (e.g. round robin, least recently used (LRU) entry, random, etc.).

If the entry has a valid stride that is greater than or equal to the minimum stride size that is prefetched by the large stride prefetch circuit 20B and for which there is available AQF credits, the entry may launch a prefetch request (decision blocks 90, 92, and 94, "yes" legs and block 96). Otherwise, the entry may not be ready to launch a prefetch request. In some embodiments, other aspects of the entry may affect readiness as well (e.g. sufficient confidence as indicated by the confidence factor CF, pending prefetch (PFC) and prefetch degree (PFD) values, etc.). In one embodiment, the primary prefetch circuit 20A and the large stride prefetch circuit 20B may track prefetches launched by the other prefetch circuit 20B/20A and may not launch prefetch requests for prefetches that have already been requested by the other prefetch circuit 20B/20A. Such an embodiment may reduce the launch of redundant prefetches for the same data. Either prefetch circuit 20A-20B may also update information in their prefetch entries based on the prefetch launched by the other prefetch circuit 20B/20A. In one embodiment, the large stride prefetch circuit 20B may implement a launched prefetch history filter which tracks the last N prefetch requests and prevents launch of redundant prefetches. In another embodiment, the large stride prefetch circuit 20B may track the prefetch requests per prefetch entry in order to reduce redundant prefetches.

Additionally, the large stride prefetch circuit may determine if the confidence factor is greater than a threshold level (decision block 98). For example, the threshold level may be one greater than the confidence factor that is sufficient to cause a launch of a prefetch. Other embodiments may use higher levels of the confidence factor as the threshold. The threshold may be programmable. If the confidence factor is greater than the threshold (decision block 98, "yes" leg), the large stride prefetch circuit 20B may determine the coverage hint to be transmitted with the MapID to the primary prefetch circuit 20A. If multiple encodings of the coverage hint are implemented, the determination may further be based on additional thresholds of the confidence factor or other measurements (block 100). The large stride prefetch circuit 20B may transmit the MapID from the entry and the coverage hint to the primary prefetch circuit 20A (block 102). The large stride prefetch circuit 20B may record that the MapID and coverage hint have been transmitted in the entry in the stride table 54 so that it need not be sent again in a later clock cycle.

System

Figure 9:
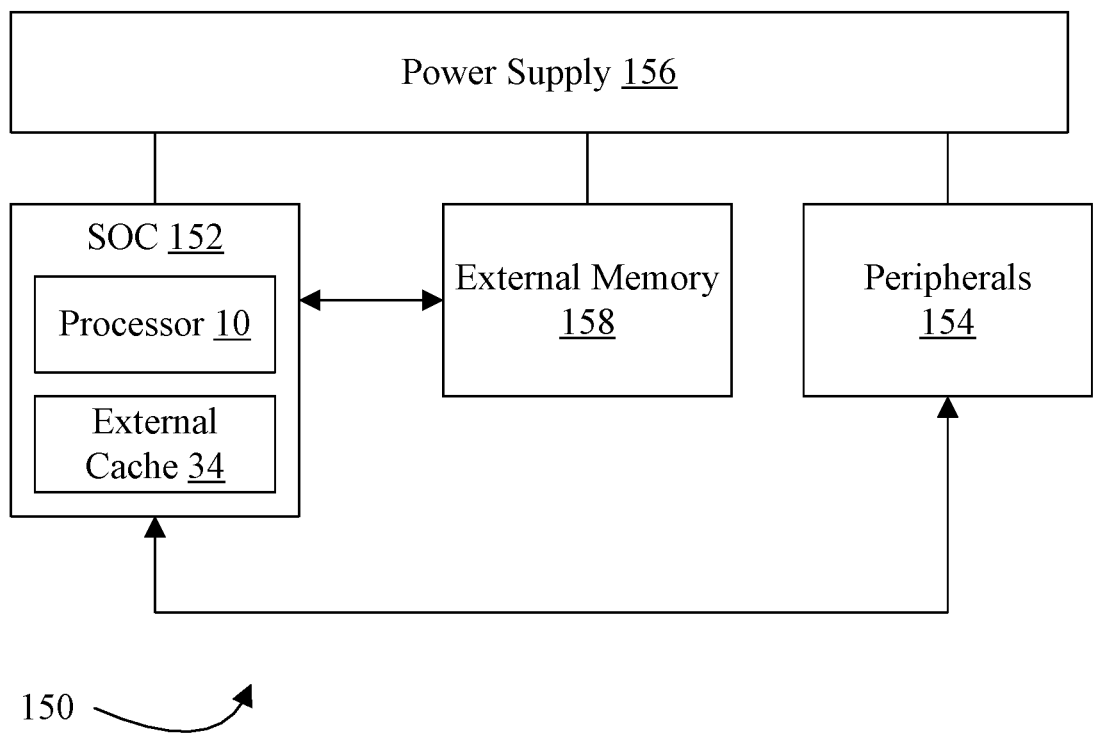
FIG. 9 is a block diagram illustrating one embodiment of a system.

Turning next to FIG. 9, a block diagram of one embodiment of a system 150 is shown. In the illustrated embodiment, the system 150 includes at least one instance of a system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of the processor 10 and external cache 34 as illustrated in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 152 in a chip-on-chip or package-on-package implementation.

Computer Readable Storage Medium

Figure 10:
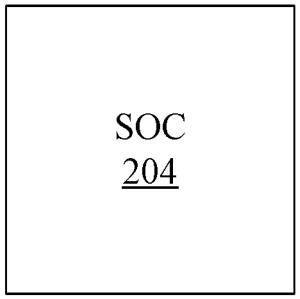
FIG. 10 is a block diagram of one embodiment of a computer accessible storage medium.

Turning now to FIG. 10, a block diagram of one embodiment of a computer readable storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 10 may store a database 204 representative of the SOC 152. Generally, the database 204 may be a database which can be read by a program and used, directly or indirectly, to fabricate the hardware comprising the SOC 152. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 152. The netlist may then be placed and routed to produce a data set describing geometric shapes to be applied to masks. The masks may then be used in various semiconductor fabrication steps to produce a semiconductor circuit or circuits corresponding to the SOC 152. Alternatively, the database 204 on the computer accessible storage medium 200 may be the netlist (with or without the synthesis library) or the data set, as desired.

While the computer accessible storage medium 200 stores a representation of the SOC 152, other embodiments may carry a representation of any portion of the SOC 152, as desired, including any subset processor 10 or portions thereof, the external cache 34 or portions thereof, etc. The database 204 may represent any portion of the above.

In accordance with the above disclosure, a processor may comprise a data cache and a plurality of prefetch circuits coupled to the data cache. A first prefetch circuit of the plurality of prefetch circuits may be configured to generate first prefetch requests for the data cache using a first prefetch mechanism. The first prefetch circuit may be configured to invoke a second prefetch circuit of the plurality of prefetch circuits responsive to a first demand access that misses in the first prefetch circuit. The second prefetch circuit may be configured to generate second prefetch requests using a second prefetch mechanism that is different from the first prefetch mechanism. The second prefetch circuit may be configured to generate second prefetch requests responsive to being invoked by the first prefetch circuit. The second prefetch circuit may be configured, responsive to prefetching data corresponding to the first demand access with a confidence level exceeding a first threshold level, to indicate to the first prefetch circuit that the confidence level has been achieved by the second prefetch circuit. The first prefetch circuit may be configured to limit a first number of the first prefetch requests generated by the first prefetch circuit and corresponding to the first demand access responsive to the indication from the second prefetch circuit, wherein the first number is non-zero and is less than a second number that would otherwise be generated by the first prefetch circuit corresponding to the first demand access. In an embodiment, the first prefetch circuit may be configured to transmit a first identifier with the first demand access to the second prefetch circuit. The second prefetch circuit may be configured to return the first identifier as part of the indication. In an embodiment, the indication may further include a value that indicates a relative amount of coverage of the second prefetch requests over data that will be demand fetched at a later point, and wherein the first number is further responsive to the value. In an embodiment, the relative amount of coverage may be full coverage for one encoding of the value, and the first prefetch circuit may be configured to terminate generation of the first prefetch requests responsive to the value indicating full coverage. In an embodiment, the relative amount of coverage may be partial coverage for another encoding of the value. The first prefetch circuit may be configured to determine the first number responsive to the value indicating partial coverage. In an embodiment, the first prefetch mechanism may be an access map/pattern match mechanism and the second prefetch mechanism may be a stride-based prefetch mechanism. In an embodiment, the stride-based prefetch mechanism may generate second prefetch requests for stride lengths greater than a first stride that is based on a size of access maps in the access map/pattern match mechanism. In an embodiment, the first stride may be one half of a size of the access maps.

In another embodiment, a processor may comprise a data cache and a plurality of prefetch circuits coupled to the data cache. A first prefetch circuit of the plurality of prefetch circuits may comprise a first memory to track first prefetch data used by the first prefetch circuit to generate first prefetch requests. The first prefetch circuit may be configured to allocate a first memory location in the first memory responsive to a first demand access that misses in the first memory. The first memory location may be identified by a first identifier, and a second prefetch circuit of the plurality of prefetch circuits may be configured to receive the first demand access and the first identifier. The second prefetch circuit may comprise a second memory to track second prefetch data used by the second prefetch circuit to generate second prefetch requests. The second prefetch circuit may be configured to allocate a second memory location of the second memory to the first demand access, wherein the second prefetch circuit may be configured to write the first identifier to the second memory location. The second prefetch circuit may be configured to determine that the second memory location is generating second prefetch requests with a confidence level greater than a threshold. The second prefetch circuit may be configured to transmit the first identifier to the first prefetch circuit. The first prefetch circuit may be configured to reduce a number of the first prefetch requests generated from the first memory location responsive to receiving the first identifier from the second prefetch circuit. In an embodiment, the second prefetch circuit may be configured to transmit a value with the first identifier the indicates a relative amount of coverage of the second prefetch requests over data that will be demand fetched at a later point. The reduction in the number of the first prefetch requests may be responsive to the value. In an embodiment, the value may indicate full coverage for one encoding of the value, and the first prefetch circuit may be configured to terminate generation of the first prefetch requests responsive to the value indicating full coverage. In an embodiment, the value indicates partial coverage for another encoding of the value, and the first prefetch circuit may be configured to determine the reduction responsive to the value indicating partial coverage. The reduced number of first prefetches may be greater than zero. In an embodiment, a first prefetch mechanism implemented by the first prefetch circuit may be an access map/pattern match mechanism and a second prefetch mechanism implemented by the second prefetch circuit may be a stride-based prefetch mechanism. In an embodiment, the stride-based prefetch mechanism generates second prefetch requests for stride lengths greater than a first stride that is based on a size of access maps in the access map/pattern match mechanism. In an embodiment, the first stride is one half of a size of the access maps.

In an embodiment, a method may comprise: receiving a first demand access in a first prefetch circuit of a plurality of prefetch circuits; detecting that the first demand access misses in a first memory in the first prefetch circuit, wherein the first memory stores first prefetch data used by the first prefetch circuit to generate first prefetch requests; allocating a first memory location in the first memory responsive to the first demand access missing in the first memory, wherein the first memory location is identified by a first identifier; receiving the first demand access and the first identifier in a second prefetch circuit of the plurality of prefetch circuits, wherein the second prefetch circuit is comprises a second memory to that stores second prefetch data used by the second prefetch circuit to generate second prefetch requests; detecting the first demand access misses in the second memory; allocating a second memory location of the second memory to the first demand access responsive to the first demand access missing in the second memory; writing the first identifier to the second memory location; determining that the second memory location is generating second prefetch requests with a confidence level greater than a threshold; transmitting the first identifier to the first prefetch circuit responsive to determining that the second memory location is generating the second prefetch requests with the confidence level greater than the threshold; and reducing a number of the first prefetch requests generated from the first memory location by the first prefetch circuit responsive to receiving the first identifier from the second prefetch circuit. In an embodiment, the method further comprises transmitting a value with the first identifier by the second prefetch circuit, wherein the value indicates a relative amount of coverage of the second prefetch requests over data that will be demand fetched at a later point, and wherein the reduction in the number of the first prefetch requests may be responsive to the value. In an embodiment, the method may further comprise terminating generation of the first prefetch requests responsive to a first encoding of the value. In an embodiment, the method may further comprise determining a reduced number greater than zero responsive to a second encoding of the value. In an embodiment, a first prefetch mechanism implemented by the first prefetch circuit may be an access map/pattern match mechanism and a second prefetch mechanism implemented by the second prefetch circuit may be a stride-based prefetch mechanism. The stride-based prefetch mechanism may generate second prefetch requests for stride lengths greater than a first stride that is based on a size of access maps in the access map/pattern match mechanism.

Numerous variations and modifications will become apparent to those skilled in the art once the above disclosure is fully appreciated. It is intended that the following claims be interpreted to embrace all such variations and modifications.

What is claimed is:

1. A processor comprising:
   a data cache; and
   a plurality of prefetch circuits coupled to the data cache, wherein a first prefetch circuit of the plurality of prefetch circuits is configured to generate first prefetch requests for the data cache using a first prefetch mechanism, and wherein the first prefetch circuit is configured to invoke a second prefetch circuit of the plurality of prefetch circuits responsive to a first demand access that misses in the first prefetch circuit, and wherein the second prefetch circuit is configured to generate second prefetch requests using a second prefetch mechanism that is different from the first prefetch mechanism, wherein the second prefetch circuit is configured to generate second prefetch requests responsive to being invoked by the first prefetch circuit, and wherein the second prefetch circuit is configured, responsive to prefetching data corresponding to the first demand access with a confidence level exceeding a first threshold level, to indicate to the first prefetch circuit that the confidence level has been achieved by the second prefetch circuit, and wherein the first prefetch circuit is configured to limit a first number of the first prefetch requests generated by the first prefetch circuit and corresponding to the first demand access responsive to the indication from the second prefetch circuit, wherein the first number is non-zero and is less than a second number that would otherwise be generated by the first prefetch circuit corresponding to the first demand access.

2. The processor as recited in claim 1 wherein the first prefetch circuit is configured to transmit a first identifier with the first demand access to the second prefetch circuit, and wherein the second prefetch circuit is configured to return the first identifier as part of the indication.

3. The processor as recited in claim 2 wherein the indication further includes a value that indicates a relative amount of coverage of the second prefetch requests over data that will be demand fetched at a later point, and wherein the first number is further responsive to the value.

4. The processor as recited in claim 3 wherein the relative amount of coverage is full coverage for one encoding of the value, and wherein the first prefetch circuit is configured to terminate generation of the first prefetch requests responsive to the value indicating full coverage.

5. The processor as recited in claim 4 wherein the relative amount of coverage is partial coverage for another encoding of the value, and wherein the first prefetch circuit is configured to determine the first number responsive to the value indicating partial coverage.

6. The processor as recited in claim 1 wherein the first prefetch mechanism is an access map/pattern match mechanism and the second prefetch mechanism is a stride-based prefetch mechanism.

7. The processor as recited in claim 6 wherein the stride-based prefetch mechanism generates second prefetch requests for stride lengths greater than a first stride that is based on a size of access maps in the access map/pattern match mechanism.

8. The processor as recited in claim 7 wherein the first stride is one half of a size of the access maps.

9. A processor comprising:
   a data cache; and
   a plurality of prefetch circuits coupled to the data cache, wherein a first prefetch circuit of the plurality of prefetch circuits comprises a first memory to track first prefetch data used by the first prefetch circuit to generate first prefetch requests, and wherein the first prefetch circuit is configured to allocate a first memory location in the first memory responsive to a first demand access that misses in the first memory, and wherein the first memory location is identified by a first identifier, and wherein a second prefetch circuit of the plurality of prefetch circuits is configured to receive the first demand access and the first identifier, wherein the second prefetch circuit comprises a second memory to track second prefetch data used by the second prefetch circuit to generate second prefetch requests, and wherein the second prefetch circuit is configured to allocate a second memory location of the second memory to the first demand access, wherein the second prefetch circuit is configured to write the first identifier to the second memory location, and wherein the second prefetch circuit is configured to determine that the second memory location is generating second prefetch requests with a confidence level greater than a threshold, and wherein the second prefetch circuit is configured to transmit the first identifier to the first prefetch circuit, and wherein the first prefetch circuit is configured to reduce a number of the first prefetch requests generated from the first memory location responsive to receiving the first identifier from the second prefetch circuit.

10. The processor as recited in claim 9 wherein the second prefetch circuit is further configured to transmit a value with the first identifier, wherein the value indicates a relative amount of coverage of the second prefetch requests over data that will be demand fetched at a later point, and wherein the reduction in the number of the first prefetch requests is responsive to the value.

11. The processor as recited in claim 10 wherein the value indicates full coverage for one encoding of the value, and wherein the first prefetch circuit is configured to terminate generation of the first prefetch requests responsive to the value indicating full coverage.

12. The processor as recited in claim 10 wherein the value indicates partial coverage for another encoding of the value, and wherein the first prefetch circuit is configured to determine the reduction responsive to the value indicating partial coverage, wherein the reduced number of first prefetches is greater than zero.

13. The processor as recited in claim 9 wherein a first prefetch mechanism implemented by the first prefetch circuit is an access map/pattern match mechanism and a second prefetch mechanism implemented by the second prefetch circuit is a stride-based prefetch mechanism.

14. The processor as recited in claim 13 wherein the stride-based prefetch mechanism generates second prefetch requests for stride lengths greater than a first stride that is based on a size of access maps in the access map/pattern match mechanism.

15. The processor as recited in claim 14 wherein the first stride is one half of a size of the access maps.

16. A method comprising:
  receiving a first demand access in a first prefetch circuit of a plurality of prefetch circuits;
  detecting that the first demand access misses in a first memory in the first prefetch circuit, wherein the first memory stores first prefetch data used by the first prefetch circuit to generate first prefetch requests;
  allocating a first memory location in the first memory responsive to the first demand access missing in the first memory, wherein the first memory location is identified by a first identifier;
  receiving the first demand access and the first identifier in a second prefetch circuit of the plurality of prefetch circuits, wherein the second prefetch circuit comprises
  a second memory that stores second prefetch data used by the second prefetch circuit to generate second prefetch requests;
  detecting the first demand access misses in the second memory;
  allocating a second memory location of the second memory to the first demand access responsive to the first demand access missing in the second memory;
  writing the first identifier to the second memory location;
  determining that the second memory location is generating second prefetch requests with a confidence level greater than a threshold;
  transmitting the first identifier to the first prefetch circuit responsive to determining that the second memory location is generating the second prefetch requests with the confidence level greater than the threshold; and
  reducing a number of the first prefetch requests generated from the first memory location by the first prefetch circuit responsive to receiving the first identifier from the second prefetch circuit.

17. The method as recited in claim 16 further comprises transmitting a value with the first identifier by the second prefetch circuit, wherein the value indicates a relative amount of coverage of the second prefetch requests over data that will be demand fetched at a later point, and wherein the reduction in the number of the first prefetch requests is responsive to the value.

18. The method as recited in claim 17 further comprising terminating generation of the first prefetch requests responsive to a first encoding of the value.

19. The method as recited in claim 17 further comprising determining a reduced number greater than zero responsive to a second encoding of the value.

20. The method as recited in claim 16 wherein a first prefetch mechanism implemented by the first prefetch circuit is an access map/pattern match mechanism and a second prefetch mechanism implemented by the second prefetch circuit is a stride-based prefetch mechanism, wherein method further comprises generating, in the stride-based prefetch mechanism, second prefetch requests for stride lengths greater than a first stride that is based on a size of access maps in the access map/pattern match mechanism.

* * * * *

UNITED STATES PATENT AND TRADEMARK OFFICE
CERTIFICATE OF CORRECTION

PATENT NO. : 11,176,045 B2  
APPLICATION NO. : 16/832893  
DATED : November 16, 2021  
INVENTOR(S) : Stephan G. Meier, Tyler J. Huberty and Nikhil Gupta Page 1 of 1

It is certified that error appears in the above-identified patent and that said Letters Patent is hereby corrected as shown below:

In the Specification

Column 11, Line 12:
Delete "access map 40" substitute "access map memory 40"

Column 13, Line 9:
Delete "prefetch circuit 36" substitute "prefetch circuit 20A"

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*